(12) United States Patent
Dostal et al.

(10) Patent No.: US 10,019,217 B2
(45) Date of Patent: Jul. 10, 2018

(54) VISUAL FOCUS-AWARE TECHNIQUES FOR VISUALIZING DISPLAY CHANGES

(71) Applicant: UNIVERSITY COURT OF THE UNIVERSITY OF ST ANDREWS, Fife, St Andrews (GB)

(72) Inventors: Jakub Dostal, Edinburgh (GB); Per Ola Kristensson, St Andrews (GB); Aaron Quigley, Edinburgh (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 13/999,355

(22) Filed: Feb. 12, 2014

(65) Prior Publication Data
US 2015/0227334 A1  Aug. 13, 2015

(51) Int. Cl.
*G06F 3/14* (2006.01)
*G06F 3/01* (2006.01)
*G09G 5/14* (2006.01)
*G09G 5/00* (2006.01)
*G09G 5/10* (2006.01)

(52) U.S. Cl.
CPC ............ *G06F 3/1423* (2013.01); *G06F 3/013* (2013.01); *G09G 5/00* (2013.01); *G09G 5/14* (2013.01); *G09G 5/10* (2013.01); *G09G 2320/103* (2013.01); *G09G 2340/10* (2013.01); *G09G 2340/12* (2013.01); *G09G 2340/14* (2013.01); *G09G 2354/00* (2013.01)

(58) Field of Classification Search
CPC .................. G06F 3/012; G06F 3/015; G06F 2203/04804; G09G 5/02; G09G 2340/12; H04N 1/32208
See application file for complete search history.

(56) References Cited

U.S. PATENT DOCUMENTS

| 5,835,083 A | * | 11/1998 | Nielsen et al. | 345/211 |
| 9,342,490 B1 | * | 5/2016 | Taylor | G06F 17/30861 |
| 2003/0212811 A1 | * | 11/2003 | Thornton | G06F 3/1431 709/231 |
| 2006/0129947 A1 | * | 6/2006 | Hamzy | G06F 9/4443 715/790 |
| 2014/0082745 A1 | * | 3/2014 | Guedalia et al. | 726/27 |

OTHER PUBLICATIONS

Mauro C. Pichiliani et al, "TeleEye: An Awareness Widget for Providing the Focus of Attention in Collaborative Editing Systems"; © ICST Institute for Computer Sciences; CollaborateCom 2008, LNICST 10, pp. 258-270, 2009.

(Continued)

*Primary Examiner* — Antonio A Caschera
(74) *Attorney, Agent, or Firm* — Moore & Van Allen PLLC; W. Kevin Ransom (57) ABSTRACT

A computer processor based method for controlling a plurality of computer displays in response to user behavior, the method comprising identifying at least one display that is unattended by the user by determining the user's visual focus, and applying an overlay window to the unattended display to control visualization of the identified unattended display.

19 Claims, 10 Drawing Sheets
(7 of 10 Drawing Sheet(s) Filed in Color)

(56) References Cited

OTHER PUBLICATIONS

Anastasia Bezerianos et al, "Mnemonic Rendering: An Image-Based Approach for Exposing Hidden Changes in Dynamic Displays"; Department of Computer Science University of Toronto; UIST '06, Oct. 15-18, 2006, Montreux, Switzerland.
Xiaojun Bi et al, "Comparing Usage of a Large High-Resolution Display to Single or Dual Desktop Displays for Daily Work"; CHI 2009 Large Displays/Multi-Display Environments; Department of Computer Science University of Toronto, Boston, Massachusetts, Apr. 4-9, 2009.
Paul Marshall et al, "Gazemarks—Gaze-Based Visual Placeholders to Ease Attention Switching"; CHI 2010: Something Eye Catching, Apr. 10-15, 2010, Atlanta, GA, USA.

\* cited by examiner

VISUAL FOCUS-AWARE TECHNIQUES FOR VISUALIZING DISPLAY CHANGES

FIELD OF THE INVENTION

The present invention relates to visual focus-aware systems and methods for visualizing display changes in large display or multiple display computing environments.

BACKGROUND

Modern computer workstation setups regularly include multiple displays in various configurations. With such multi-display setups more display real-estate is available than most are able to comfortably attend to. While the benefits of large or multi-display setups have been demonstrated in several studies, it has also been suggested that this increase in display space leads to usability problems, window management difficulties and issues related to information overload.

Another potential issue is change blindness: users' inability to detect significant visual display changes when there is a disruption in continuity such as a brief flicker or a shift in visual focus. The effects of change blindness in multi-display environments have not been extensively studied. However, in one study, change blindness was reported as being a significant factor for operators managing critical events using multi-display command and control systems with unattended displays.

In general, the increased display real-estate afforded by multi-display setups means that users are unable to attend to all of it at once. In particular, this point is reached when the total display area is so large that it does not fit within the user's field of vision. In this case, the user has to substantially turn their head to see different parts of the display environment. This situation can arise when the number of displays or the distance between the displays increases. For example, it is likely to occur when users are working with three displays aligned bezel to bezel. When the user is only able to observe part of the multi-display environment, changes occurring on the unattended displays are difficult to track.

SUMMARY OF THE INVENTION

According to an aspect of the invention there is provided a computer processor based method for controlling a plurality of computer displays in response to user behavior. The method involves identifying at least one display that is unattended by the user by determining the visual focus of the user and controlling visualization of the identified unattended display. By visual focus, it is meant a point or area in space contained within a user's foveal field of vision. The unattended display is a display, which is not located within an area of visual focus of a user.

Controlling visualization is done by applying an overlay window to an unattended display or window, thereby to control visualization of the identified unattended display. An advantage of doing this is that the visualization is generic and can be applied to any operating system or computer.

Controlling the visualization or look of unattended displays or screens can help assist users in perceiving and tracking display changes in multi-display environments or large display environments.

Controlling visualization of the unattended display may comprise causing a visual change indicative of the display being unattended.

Controlling visualization of the unattended display may comprise presenting a static or fixed screen shot of contents of the display prior to it becoming unattended and maintaining this on display until the display is next identified as being attended.

The method may involve monitoring updates associated with the unattended display. Monitoring updates may comprise capturing at least two screen frames and determining a difference between the two frames. A visual aspect of the unattended display may be changed in response to updates associated with the unattended display. For example, the brightness of an area of the unattended display may be modified to show that an update has taken place, and/or a series of features may be presented, each feature being representative of an update. In the latter case, each feature may indicate a time of occurrence of the update. The series of features may be displayed around at least an area of the display.

Determining which display the user is looking at may be done by determining user's visual focus and using this to identify the unattended display.

According to another aspect of the invention, there is provided a user-interactive display management system comprising a plurality of displays operable to display a plurality of windows, and a processor adapted to identify an unattended window by determining a user's visual focus and to control appearance of the unattended window. The processor may be adapted to monitor updates associated with the unattended window.

A sensor or a monitor may be in communication with the processor, the sensor or monitor being operable to sense or monitor direction of visual focus of a user.

According to yet another aspect of the invention there is provided user-interactive display management system for implementing any of the computer controlled visualization processes described herein.

According to still another aspect of the invention there is provided a computer program product have code or instructions for implementing any of the computer controlled visualization processes described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of the invention will now be described by way of example only and with reference to the accompanying drawings, of which.

DETAILED DESCRIPTION OF THE DRAWINGS

Figure 1:
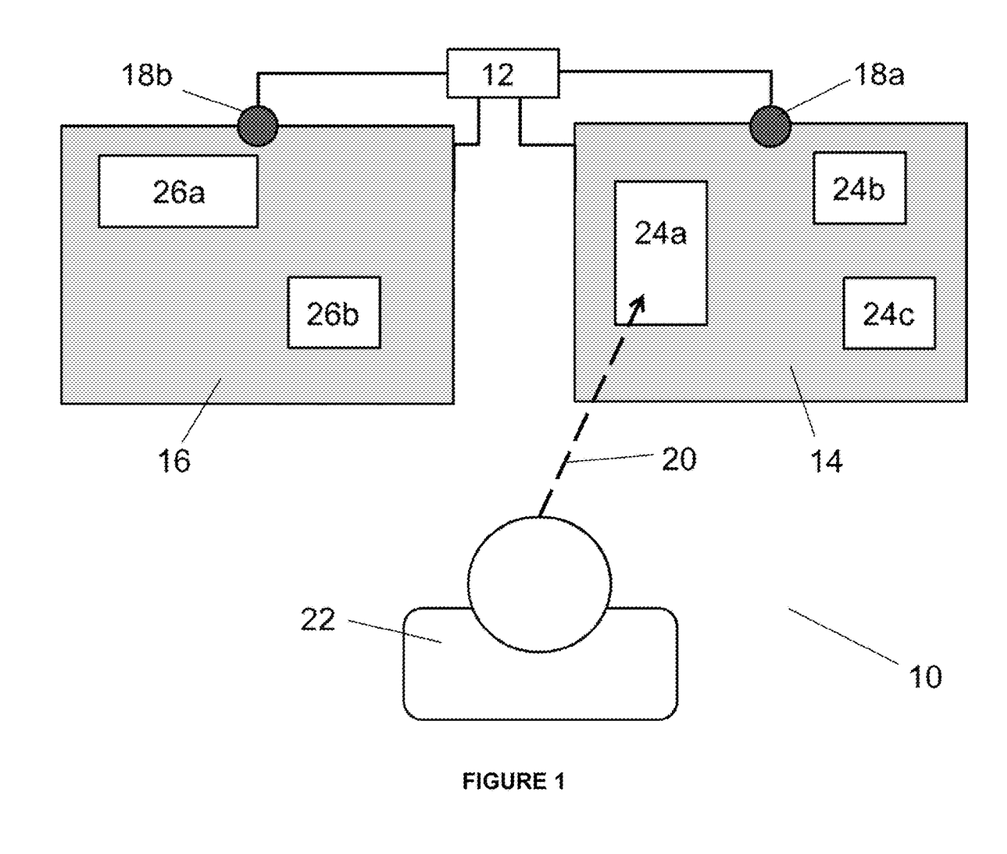
FIG. 1 is a front view of a user-interactive display management system.

FIG. 1 shows a visual focus-aware user-interactive display management system 10 that enables easy visualization of display changes on unattended displays. The system has a processor 12 in communication with two displays 14 and 16 adapted to show a plurality of application windows 24 and 26, and a visualization application for controlling visualization of the displays. In most implementations, the processor 12 is part of a conventional PC and is operable to control normal PC functions, such as opening applications and displaying application windows 24 and 26, as well as to control visualization of display changes on unattended displays.

Each display 14, 16 is equipped with a camera or sensor 18a, 18b in communication with the processor 12. Each camera or sensor 18a, 18b may be a conventional web camera that is attached to or is part of the associated display. The cameras or sensors 18a,18b together with the processor 12 form a visual focus monitor also referred to as a display-level visual focus detector for monitoring the visual focus 20 of a user 22. When a display is located in the area of visual focus of the user 22 (i.e. an imaginary cone of space defined by the position of the user's eyes and the area in space visible within the user's foveal field of view), it is referred to as the attended-display 14. When a display is not located in the area of visual focus of the user, it is referred to as the unattended-display 16.

The processor 12 is configured to run a visual focus algorithm for tracking the visual focus 20 of the user 22 and a control display process for controlling visualization of the displays 14 and 16. Gaze direction is a good approximation of visual focus. Techniques for determining direction of gaze are well known and so will not be described in detail. Any technique known in the art could be used.

The visual focus-aware display management system controls the unattended display 16 to cause visualization of pixel level changes on the unattended display. Four different methods for doing this will be described. These methods are intended to be used within an existing work context of the user. For this reason, the methods minimize user distraction from his primary task. Each method visualizes display changes in a different manner associated with specific advantages in terms of information content and distraction prevention. In use, the user 22 might select the visualization method that suits best his specific requirements.

When the visualization application is first run, an overlay window is constructed. The window is constructed only once and is then re-used every time visualization of an unattended display is active. When the window is shown, application focus is taken from the last active application and given to the overlay window. This allows the overlay window to be positioned on top of all other windows or other visual elements on the display. When the overlay window is hidden, the application focus is given back to the last active application to avoid interfering with user inputs. Using an overlay window to control visualization of an unattended display allows for deployment in any operating system or computer without modification.

The overlay window is created as follows. Firstly, a window is created with its content area exactly the same pixel resolution as the display. For example, if the display were 1024 pixels wide and 768 pixels high, the inner dimensions of the overlay window would also be 1024 pixels wide and 768 pixels high. Then all window decorations (window border, decorative frame, title bar buttons, title bar) are removed, so only the window content area is visible. Then the position of the overlay window is translated, so that the top-left corner of the window is perfectly aligned with the top-left corner of the display. This translation ensures that the pixel coordinate systems of the window and the display are aligned. This also means that every pixel position in the overlay window (and so in the visualizations) is shown directly on top of the corresponding pixel on the display.

Once the size and position of the overlay window are finalized as described above, the only remaining modifications are performed depending on the visualization used and on interaction with the user. Both concern the opacity of the overlay window. The opacity of the window is controlled using the blending functions provided by the developer or the operating system. The opacity values used range from 1 to 0, where opacity of 1 means the window is fully opaque (i.e. only the pixels from the overlay window are visible), opacity of 0.5 means that 50% of the color and brightness come from a pixel in the overlay window and 50% come from the corresponding pixel on the underlying live desktop, and opacity of 0 means that the overlay window is completely transparent and only the live desktop pixels are visible.

Figure 2:
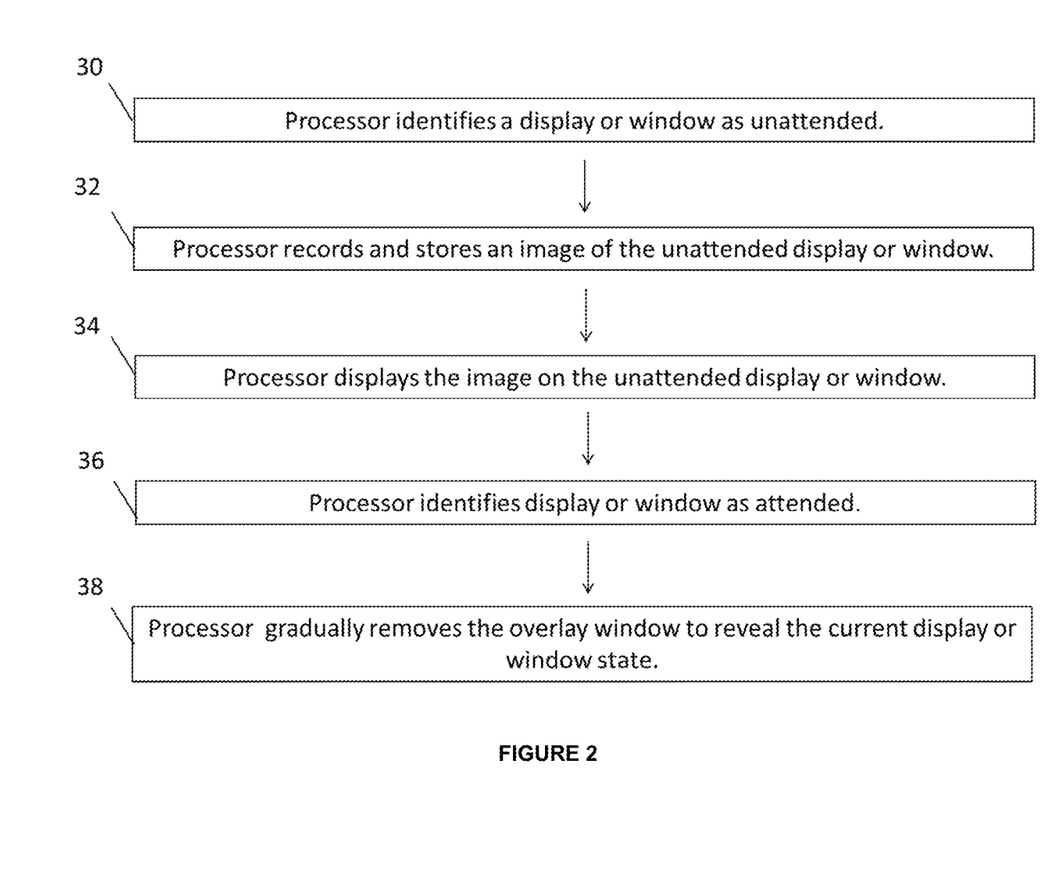
FIG. 2 is a flow diagram of the stages of a first method for visualizing changes in an unattended display.

FIG. 2 shows a flow diagram of the stages involved in a first method (method-one) for visualizing changes on an unattended display. This hides visual changes occurring on an unattended display until the user's visual focus shifts towards it again. When the user starts by attending a display for example display 14 and switches visual focus from display 14 to display 16, the visual focus monitor measures a shift in the visual focus. This enables the processor to identify display 14 as unattended by the user 30. The processor then captures a frame of display 14 at the time the user shifted his visual focus to display 16. The captured frame is recorded and stored 32. The visualization application uses the captured frame to generate an overlay window that is a copy of the captured frame. This overlay image of the captured frame overlays the display until the display becomes attended again. The overlay window is located in front of the real view of the unattended display, but does not interfere with that view, so that in the event application windows are open, these continue to be up-dated or altered as and when applications run in the background. The effect of this is that when the overlay window is removed, the current state of the application windows is visible.

Figure 3:
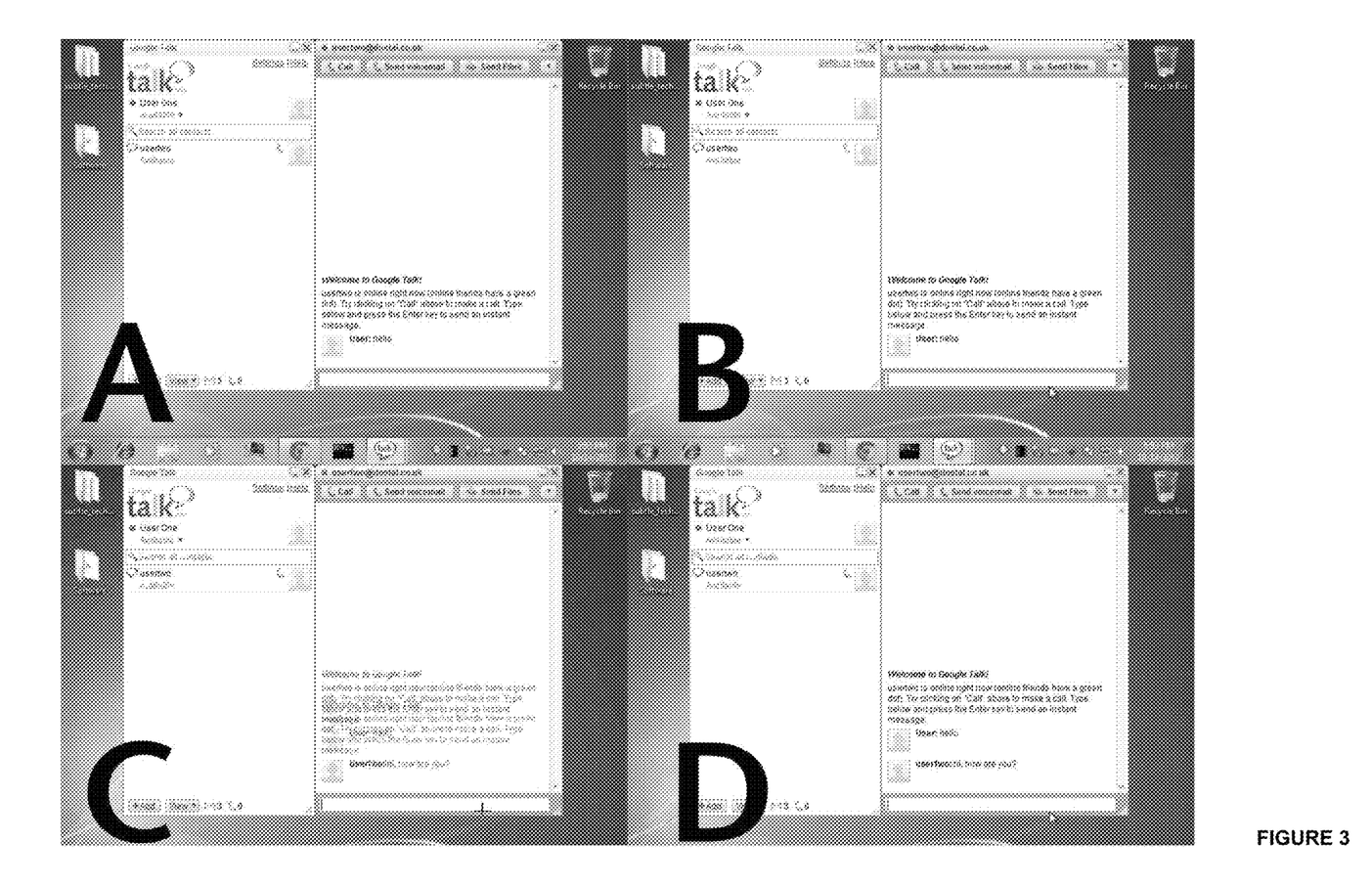
FIG. 3 is a series of four screen frames as displayed using the method of FIG. 2 between two successive display attendances.

FIG. 3 shows a series of frames that illustrate method one. Frame A of FIG. 3 shows an instant message chat window (specifically Google Talk). This is the last frame on display 14 before the user shifts visual focus away from display 14. With reference to FIGS. 2 and 3, this frame is recreated using an overlay window and is displayed 34 on display 14 as a black and white static, unchanging image, as shown in Frame B of FIG. 3. In this visualization, the overlay window has opacity of 1.0, meaning that the window is fully opaque. Even if changes, such as a new instant message appearing in the chat window, occur at the application level, these are not displayed whilst the display remains unattended. No visual change is then shown on the unattended display 14 until the user switches visual focus from display 16 back to display 14 at which point the processor identifies 36 the display 14 as attended. The processor then gradually 38, over a short time period, for example several seconds, changes the opacity of the static black and white image (Frame B of FIG. 3) of the overlay window on display 14 revealing the live display or application windows. Frame C illustrates the gradual blending of the overlay window into the current display state. Frame D shows the current display state. Gradually changing the opacity of the overlay window may happen regardless of whether a change has occurred on the unattended display. Alternatively, the opacity of the static-frame of the overlay window may change gradually only if a change has occurred on the unattended display.

Figure 4:
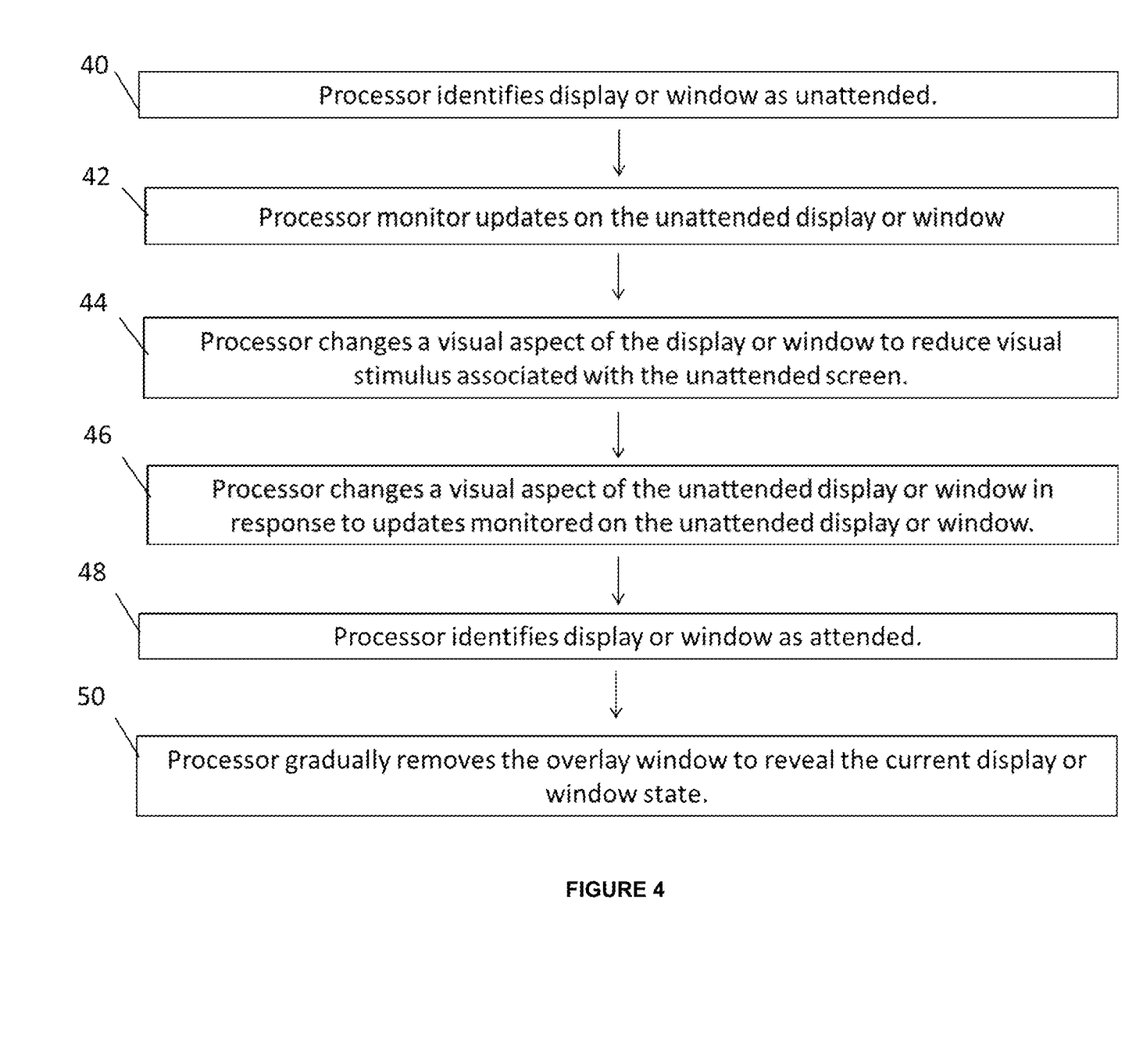
FIG. 4 is a flow diagram of the stages of another method for visualizing changes in an unattended display.

FIG. 4 shows the stages involved in another method for visualizing changes on an unattended display. Upon identification of the unattended display or window 40, the processor monitors updates on the unattended display or window 42 and changes a visual aspect of the display or window to reduce visual stimulus associated with the unattended window 44, for example by overlaying a grey overlay window. The processor also changes a visual aspect of the unattended window in response to updates associated with the unattended display or window 46. This can be done in a number of ways, for example using temporal heat map visualization methods that show the user a level of change that occurred while the display was unattended or visualizing short-term display changes on the unattended display. When the user returns his visual focus to the display or window, the processor identifies the display or window as attended 48, and gradually changes its opacity to 0, revealing the live display or application windows 50.

Figure 5:
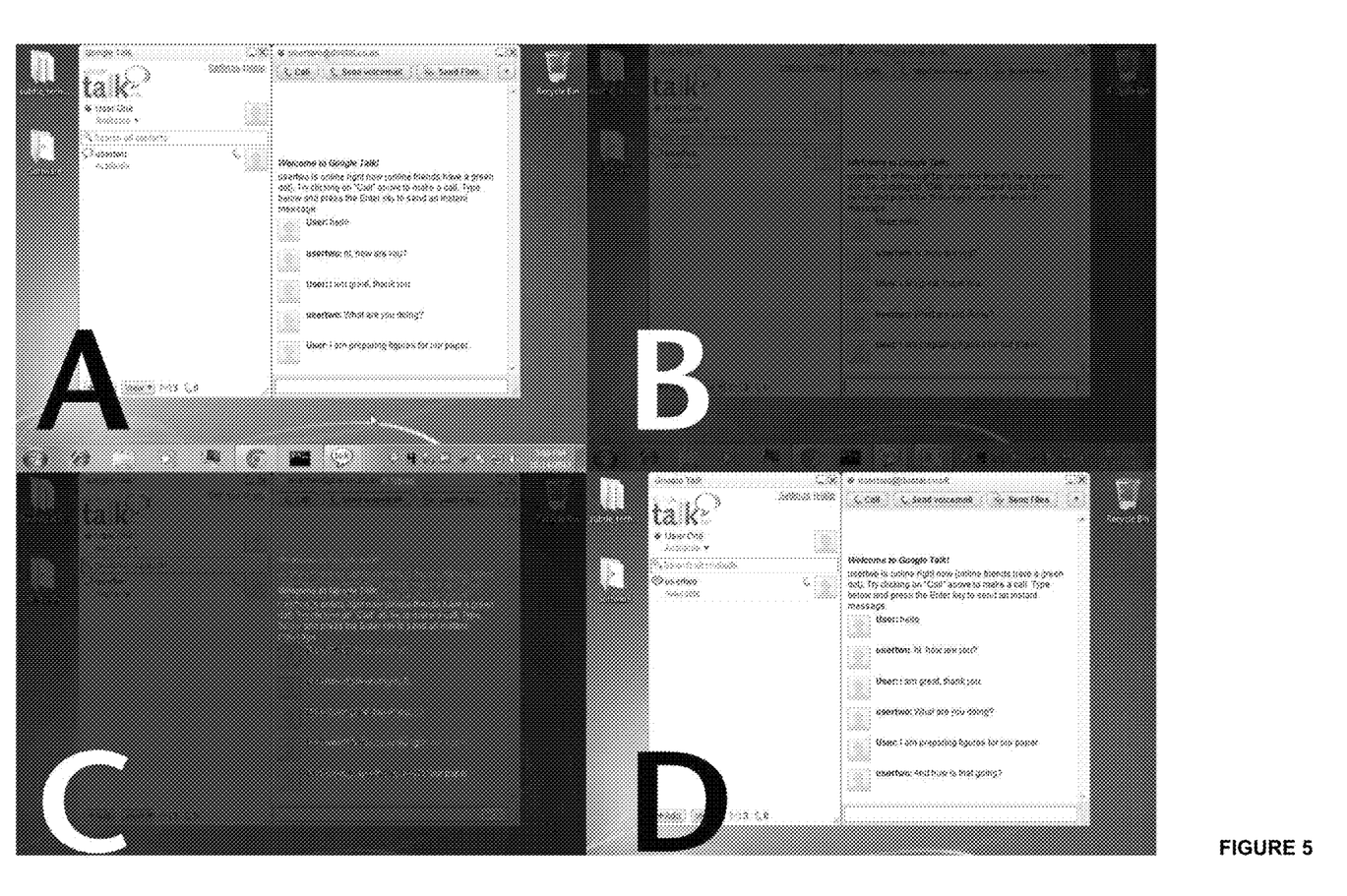
FIG. 5 is a series of four screen frames as displayed using one version of the method of FIG. 4.

FIG. 5 shows a series of four screen frames, labeled A, B, C and D obtained at various stages between two successive display attendances using a temporal heat map visualization method that shows the user the changes that occurred while the display was unattended. This visualization method will be referred to as method-two. When the user shifts his visual focus from display 14 to display 16, the processor identifies display 14 as unattended 40. Frame A shows the last frame before the user switches visual focus away from display 14. At this point, display 14 is darkened to reduce distractions 44. This is done using the overlay window with opacity set, for example, to 0.7. Frame B shows a frame of the unattended display 14 before any visual change takes place. While the user's visual focus is directed elsewhere, the processor monitors updates on display 14 by capturing a frame (a screenshot of the contents of display 14) at regular intervals, approximately six times per second 42. The processor then computes a difference in pixel values between the two most recently captured frames for the entire display and displays the change on display 14, 46 by varying the brightness of the corresponding pixels in the overlay window. Frame C illustrates how the technique visualizes the change (a new instant message in the chat window) when it happens by brightening the pixels that changed in the chat window. This process continues until the user's visual focus returns to display 14, at which point the processor identifies display 14 as attended 48 and gradually changes the opacity of the image displayed on display 14 into a live image over a specified timeframe 50 by gradually changing the overlay window's opacity to 0 and then removing the window. Frame D shows the state of display 14 when the user returns his visual focus to display 14.

Figure 6:
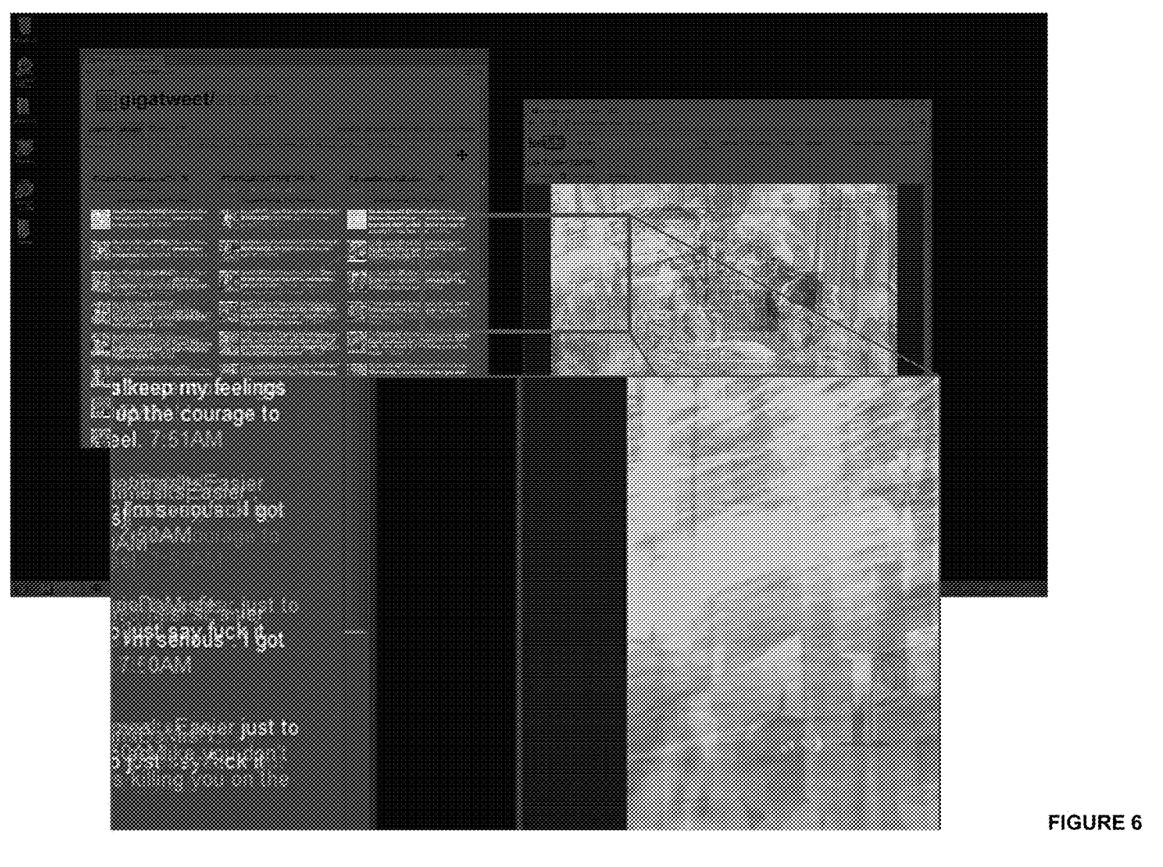
FIG. 6 is a detailed example of change visualized as bright pixels.

FIG. 6 shows an example of another unattended display on which two windows are open and an overlay window is in place, together with an expanded view of changes visualized as bright pixels. In this case, both windows have changed from the initial view and the opacity of the overlay window is altered to brighten the pixels where changes are detected.

The following formula is used to compute the value of pixels: Vnew=(Vprevious×Decay)+(Vdiff×Intensity), where Vnew is the new pixel value, Vprevious is the pixel value of the corresponding pixel in the previous iteration of the heat map. Vdiff is the intensity of change between the last frame and the current frame measured as the difference in RGB values for the corresponding pixels. Decay is a fraction denoting how quickly the current value should fade over time, and Intensity defines how much of the intensity of Vdiff will be added to the heat map. The decay and intensity are empirically determined parameters.

Figure 7:
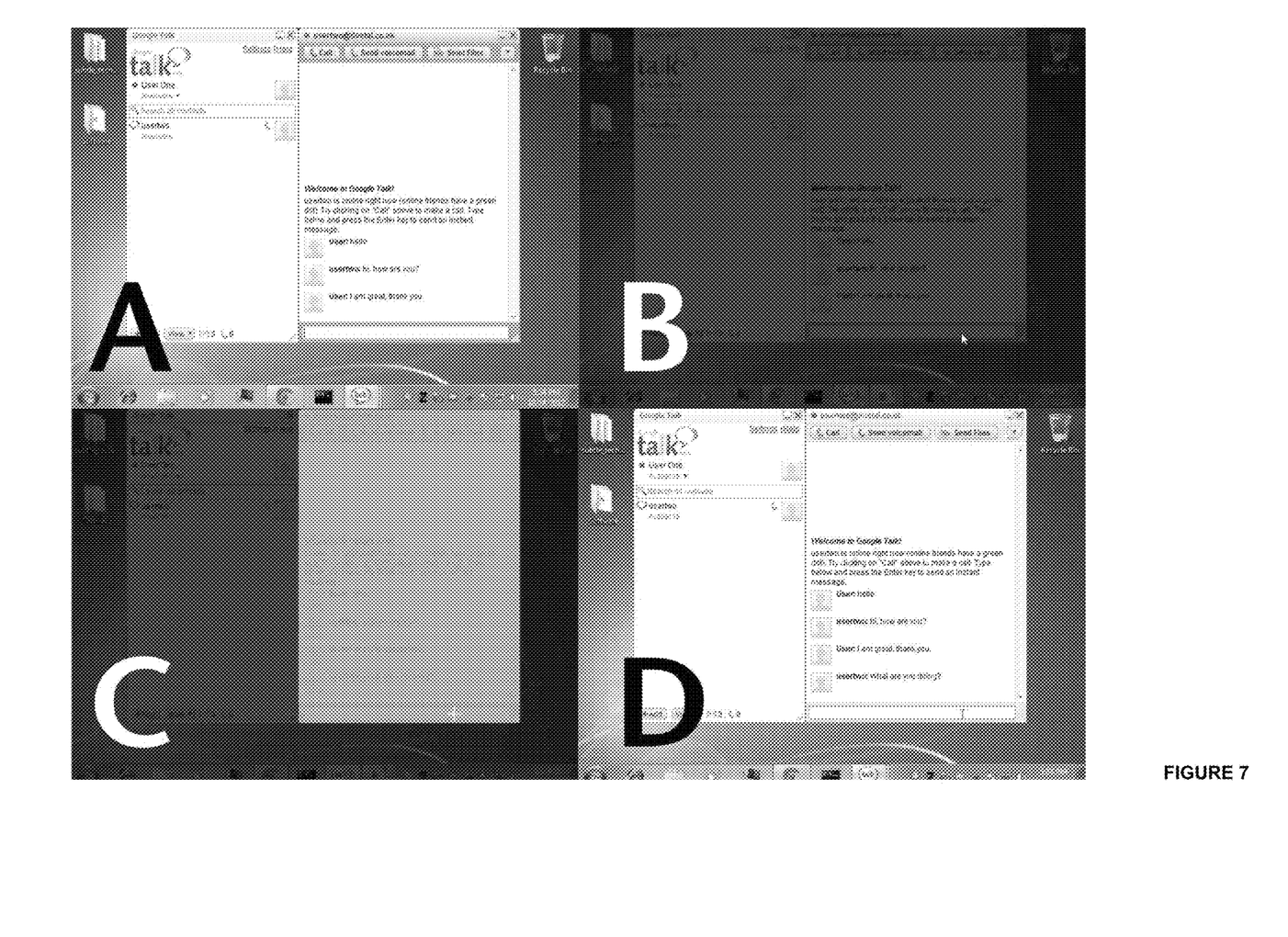
FIG. 7 is a series of four screen frames as displayed using another version of the method of FIG. 4.

FIG. 7 shows a series of four screen snapshots labeled A, B, C and D, obtained using another temporal heat map visualization method. This will be referred to as method-three. This visualization method works identically to method-two except that the amount of change in the unattended display is computed for application-window areas on the display instead for individual pixels. Frame A shows the last frame before the user shifts visual focus away from this display. Frame B shows a frame of the unattended display before any visual change. Frame C illustrates how the technique visualizes change (a new instant message in the chat window) as it happens by brightening the chat window. In addition, the content of the window is up-dated. Frame D shows the current display state after the overlay window's opacity is reduced to 0 and the overlay window is removed.

Figure 8:
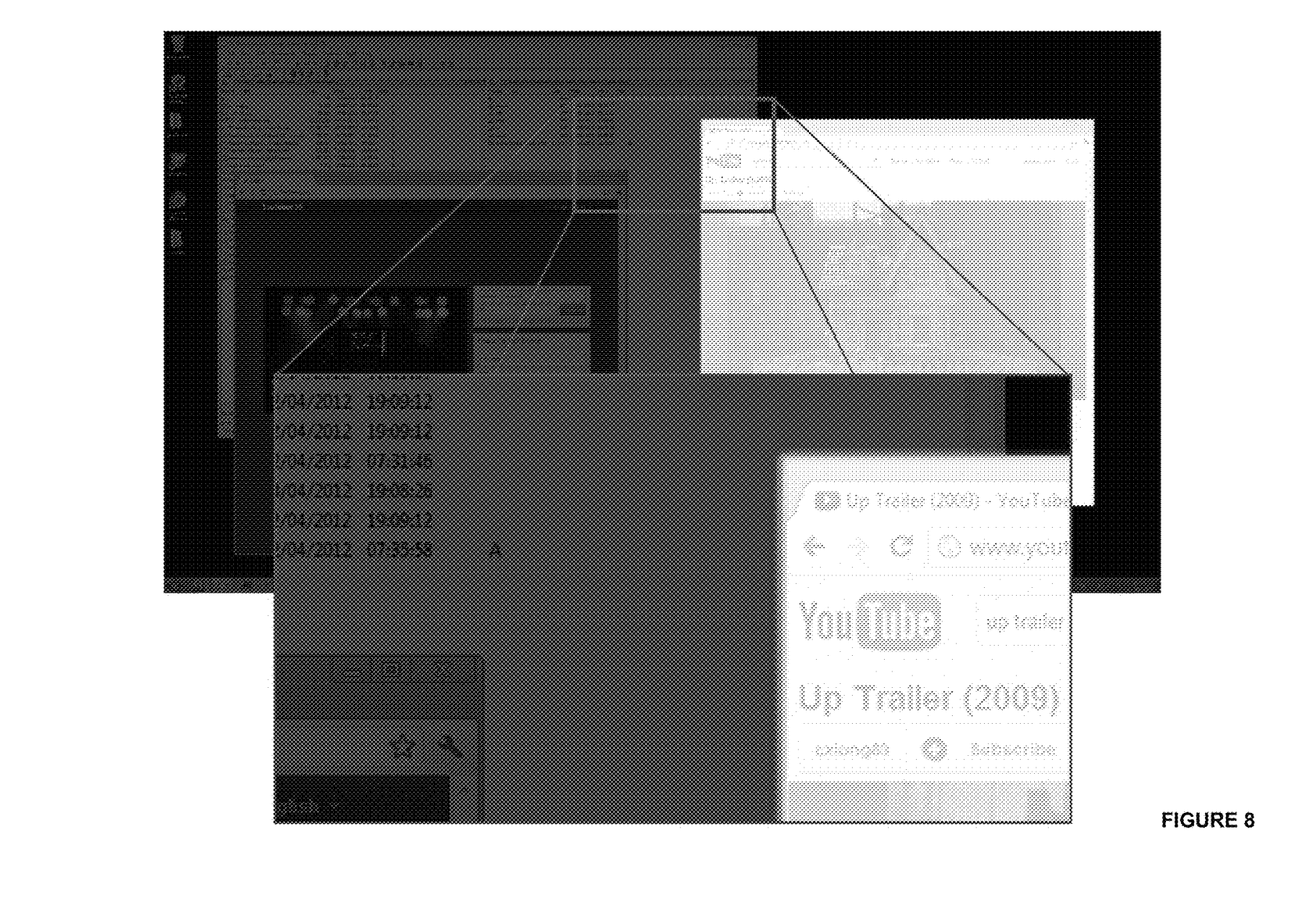
FIG. 8 is a detailed view of change visualized by brightening an application window.

FIG. 8 shows a detailed example of change visualized by brightening the application window, where the change occurred. The decay and intensity parameters are empirically determined as described with reference to method-two. In this case, two windows are open in the last viewed display, and the change is in the YouTube window. To visualize this change, the opacity of the overlay window in the area corresponding to the YouTube window is varied to brighten the YouTube window relative to the other window. In this way, changes are visualized at the application window level.

Figure 9:
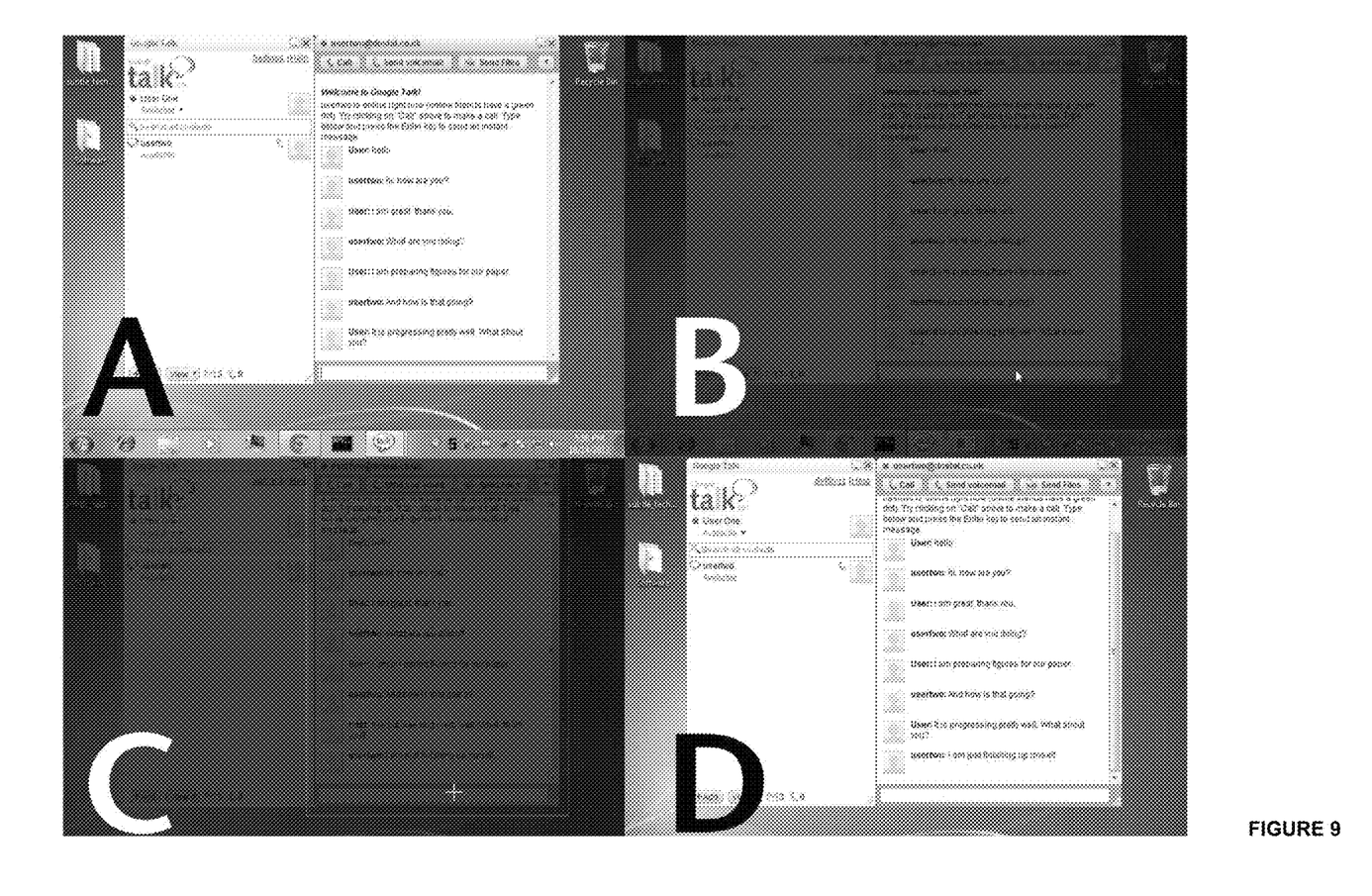
FIG. 9 is a series of four screen frames as displayed using another version of the method of FIG. 4.

FIG. 9 shows a series of four screen snapshots labeled A, B, C and D obtained at various stages using another method for visualizing changes on an unattended display. This method uses short-term display changes to visualize changes that occurred while the display was unattended. This will be referred to as method-four. In this case, when the user shifts visual focus from display 14 to display 16, the processor identifies display 14 as unattended 40. Frame A shows the last frame before the user shifts visual focus away from display 14. At this point, display 14 is darkened by overlaying a suitably opaque overlay window to reduce distractions 44. Frame B shows a frame of the unattended display 14 before any visual change takes place.

While the user's visual focus is directed elsewhere, the processor monitors updates on the unattended display 14 by continually capturing the last twenty frames of the unattended display at approximately one-second intervals 42. The change for a particular frame is then visualized 46 as a thin rectangle around the window in which the change occurred and is visible on the unattended display 14. Frame C illustrates a rectangle around a chat window, indicating occurrence of a new instant message. The brightness of the rectangle for each application window is proportional to how much the window in the frame changed in relation to the previous frame. Since the processor tracks the changes for the last twenty frames, the visualization ends up with twenty evenly spaced thin rectangles around each window.

The closer a rectangle is to its window, the more recent the visualized change. As before, the visualization is implemented using the overlay window, which generates the rectangles as and when changes are detected.

Figure 10:
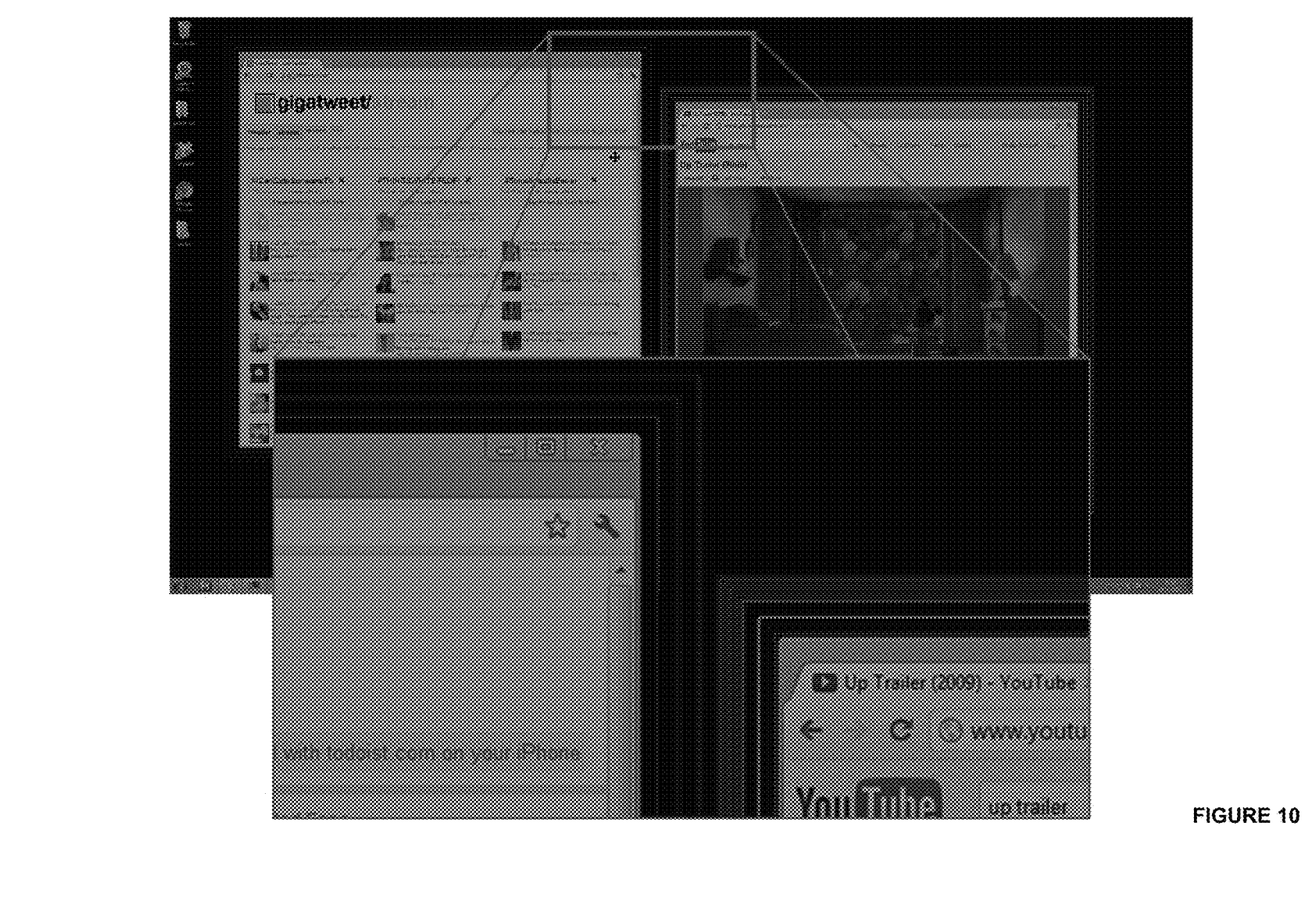
FIG. 10 is a detailed example of change visualized as rectangle of varying brightness projected around the application window.

FIG. 10 shows a detailed view of change visualized as rectangles of varying brightness projected around two application windows where change has occurred. A window with many changes (such as a video player) results in cycles of bright rectangles, while a window with few changes (such as an instant messaging window) results in occasional bright rectangles. This process continues until the user's visual focus returns to display 14, at which point the processor identifies display 14 as attended 48, following which the overlay window's opacity is gradually reduced to 0 and the overlay window is removed to reveal the live display or application windows, 50. Frame D shows the state of display 14 when the user returns his visual focus to display 14.

A skilled person will appreciate that variations of the disclosed arrangements are possible without departing from the invention. Whilst the invention is described primarily with reference to multiple displays, it could also be used in a single display system. For example, the display as a whole could be monitored as described above. However, the visual focus detector tracks only whether the single display is attended or unattended. This requires no alteration of any part of the system. Alternatively, the method may be adapted for more fine grained gaze tracking, where the single display is sub-divided into regions of interest (e.g. application windows if multiple applications share the display space or even parts of an application window for visually complex applications), which can be either attended or unattended. In this case, the visual focus and the corresponding point or area on a display has to be mapped to be able to evaluate which regions of interest are attended or unattended. Otherwise, the methods described above remain the same. Accordingly, the above description of the specific embodiment is made by way of example only and not for the purposes of limitation. It will be clear to the skilled person that minor modifications may be made without significant changes to the operation described.

The invention claimed is:

1. A computer processor based method for controlling a plurality of computer displays in response to user behavior, the method comprising:
   determining a user's visual focus using a visual focus detector relative to the plurality of computer displays;
   identifying at least one display of the plurality of computer displays that is unattended by the user using the determined user's visual focus;
   generating, using a computer processor, an overlay window;
   outputting for display on the at least one unattended display, via control of the unattended display by a computer processor, the overlay window to control visualization of the at least one identified unattended display;
   detecting updates on the unattended display; and
   altering a visual aspect of the overlay window on the unattended display in response to the detected updates on the unattended display so that the overlay window is displayed in an altered form on the unattended display as to indicate to the user that the unattended display underlying the overlay window has changed.

2. The method as claimed in claim 1, wherein the overlay window causes a visual change indicative of the at least one display being unattended.

3. The method as claimed in claim 1, wherein the overlay window is a static or fixed image of contents of the at least one display prior to the at least one display becoming unattended.

4. The method as claimed in claim 1 further comprising monitoring updates associated with the at least one unattended display, wherein monitoring updates comprises capturing at least two screen frames and determining a difference between the two screen frames.

5. The method as claimed in claim 1, wherein changing the visual aspect of the overlay window of the at least one unattended display further comprises modifying a level of brightness of an area of the at least one unattended display to show that an update has taken place.

6. The method as claimed in claim 1, wherein changing the visual aspect further comprises displaying a series of features, each feature being representative of an update.

7. The method as claimed in claim 1, wherein changing the visual aspect further comprises displaying a series of features, each feature being representative of an update and indicative of a time of occurrence of the update.

8. The method as claimed in claim 1, wherein changing the visual aspect comprises displaying a series of features, each feature being representative of an update and the series of features being displayed around at least an area of the at least one unattended display.

9. The method as claimed in claim 1, wherein the overlay window is adapted to modify a level of brightness of the at least one unattended display.

10. A user-interactive display management system comprising:
    a plurality of displays operable to display a plurality of windows; and
    a processor adapted to:
      determine a user's visual focus using a visual focus detector relative to the plurality of computer displays;
      identify at least one display of the plurality of computer displays that is unattended by the user using the determined user's visual focus;
      generate an overlay window;
      control an appearance of the unattended computer display, via outputting for display on the unattended computer display the overlay window;
      detect updates on the unattended computer display; and
      alter a visual aspect of the overlay window on the unattended display in response to the detected updates on the unattended display so that the overlay window is displayed in an altered form on the unattended display as to indicate to the user that the unattended display underlying the overlay window has changed.

11. A computer program product for causing one or more computer processors to control a plurality of computer displays in response to user behavior, the computer program product comprising computer-readable program instruction portions stored on a non-transitory computer-readable medium, the computer program product program instruction portions comprising:
    instruction portions for determining a user's visual focus using a visual focus detector relative to the plurality of computer displays;
    instruction portions for identifying at least one unattended display of the plurality of computer displays that is unattended by the user using the determined user's visual focus;
    instruction portions for generating an overlay window;

instruction portions for outputting for display on the at least one unattended display, via control of the unattended display, the overlay window to the unattended display to control visualization of the at least one identified unattended display;

instruction portions for detecting updates on the unattended display; and instruction portions for altering a visual aspect of the overlay window on the unattended display in response to the detected updates on the unattended display so that the overlay window is displayed in an altered form on the unattended display as to indicate to the user that the unattended display underlying the overlay window has changed.

12. The computer program product as claimed in claim 11, wherein the overlay window causes a visual change indicative of the at least one display being unattended.

13. The computer program product as claimed in claim 11, wherein the overlay window is a static or fixed image of contents of the at least one display prior to the at least one display becoming unattended.

14. The computer program product as claimed in claim 11 further comprising instruction portions for monitoring updates associated with the at least one unattended display, wherein monitoring updates comprises capturing at least two screen frames and determining a difference between the two screen frames.

15. The computer program product as claimed in claim 11, wherein the instruction portions for changing the visual aspect of the overlay window further comprise instruction portions for modifying a level of brightness of an area of the at least one unattended display to show that an update has taken place.

16. The computer program product as claimed in claim 11, wherein the instruction portions for changing the visual aspect of the overlay window further comprise instruction portions for displaying a series of features, each feature being representative of an update.

17. The computer program product as claimed in claim 11, wherein the instruction portions for changing a visual aspect of the overlay window further comprise instruction portions for displaying a series of features, each feature being representative of an update and indicative of a time of occurrence of the update.

18. The computer program product as claimed in claim 11, wherein the instruction portions for changing the visual aspect of the overlay window further comprise instruction portions for displaying a series of features, each feature being representative of an update and the series of features being displayed around at least an area of the at least one unattended display.

19. The computer program product as claimed in claim 11 further comprising instruction portions for using the overlay window to modify a level of brightness of the at least one unattended display.

* * * * *